United States Patent
Furukawa et al.

(10) Patent No.: US 11,455,730 B2
(45) Date of Patent: Sep. 27, 2022

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Daisuke Furukawa, Tokyo (JP); Fukashi Yamazaki, Kawasaki (JP); Keita Nakagomi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 45 days.

(21) Appl. No.: 16/835,026

(22) Filed: Mar. 30, 2020

(65) Prior Publication Data
US 2020/0320713 A1    Oct. 8, 2020

(30) Foreign Application Priority Data
Apr. 4, 2019    (JP) .............................. JP2019-072302

(51) Int. Cl.
*G06T 7/162*    (2017.01)
*G06T 7/11*     (2017.01)

(52) U.S. Cl.
CPC ...... *G06T 7/11* (2017.01); *G06T 2207/20081* (2013.01)

(58) Field of Classification Search
CPC combination set(s) only.
See application file for complete search history.

(56) References Cited

U.S. PATENT DOCUMENTS

| | | | |
|---|---|---|---|
| 6,973,212 B2 | 12/2005 | Boykov | |
| 2013/0163844 A1* | 6/2013 | Ozaki | G06K 9/0014 382/133 |
| 2015/0066820 A1* | 3/2015 | Kapur | G06N 20/00 706/12 |
| 2015/0278582 A1* | 10/2015 | Petyushko | G06K 9/00208 382/118 |
| 2015/0371105 A1* | 12/2015 | Yang | G06T 3/00 348/136 |
| 2016/0078625 A1* | 3/2016 | Tajbakhsh | G06T 7/0012 382/128 |
| 2016/0085310 A1* | 3/2016 | Shotton | G06K 9/6282 382/103 |
| 2017/0124717 A1* | 5/2017 | Baruch | G06T 7/194 |
| 2017/0272651 A1* | 9/2017 | Mathy | H04N 13/257 |

(Continued)

OTHER PUBLICATIONS

Ronneberger, O., et al., "U-Net: Convolutional Networks for Biomedical Image Segmentation", May 18, 2015, pp. 1-8.

*Primary Examiner* — Cindy Trandai
(74) *Attorney, Agent, or Firm* — Canon U.S.A., Inc. IP Division

(57) ABSTRACT

An image processing apparatus includes a first extraction unit configured to extract a first target region from an image using a trained classifier, a setting unit configured to set region information to be used in a graph cut segmentation method based on a first extraction result including the first target region, a second extraction unit configured to extract a second target region using the graph cut segmentation method based on the set region information, and a generation unit configured to generate a ground truth image corresponding to the image based on a second extraction result including the second target region.

25 Claims, 6 Drawing Sheets

(56) References Cited

U.S. PATENT DOCUMENTS

| | | | |
|---|---|---|---|
| 2018/0025250 A1* | 1/2018 | Chen | G06K 9/46 |
| | | | 382/292 |
| 2018/0075628 A1* | 3/2018 | Teare | G06V 10/82 |
| 2018/0089497 A1* | 3/2018 | Romanenko | G06V 10/255 |
| 2018/0225820 A1* | 8/2018 | Liang | G06K 9/627 |
| 2019/0065864 A1* | 2/2019 | Yu | G06V 20/56 |
| 2019/0080450 A1* | 3/2019 | Arar | G06T 7/194 |
| 2019/0205606 A1* | 7/2019 | Zhou | G06N 3/0454 |
| 2019/0244362 A1* | 8/2019 | Movshovitz-Attias | |
| | | | G06T 7/136 |
| 2019/0251694 A1* | 8/2019 | Han | G06T 7/174 |
| 2019/0266418 A1* | 8/2019 | Xu | G06K 9/4604 |
| 2020/0034976 A1* | 1/2020 | Stone | G06N 3/0454 |
| 2020/0089969 A1* | 3/2020 | Lakshmi Narayanan | |
| | | | G06K 9/00718 |
| 2021/0209387 A1* | 7/2021 | Nikitidis | G06K 9/00221 |

* cited by examiner

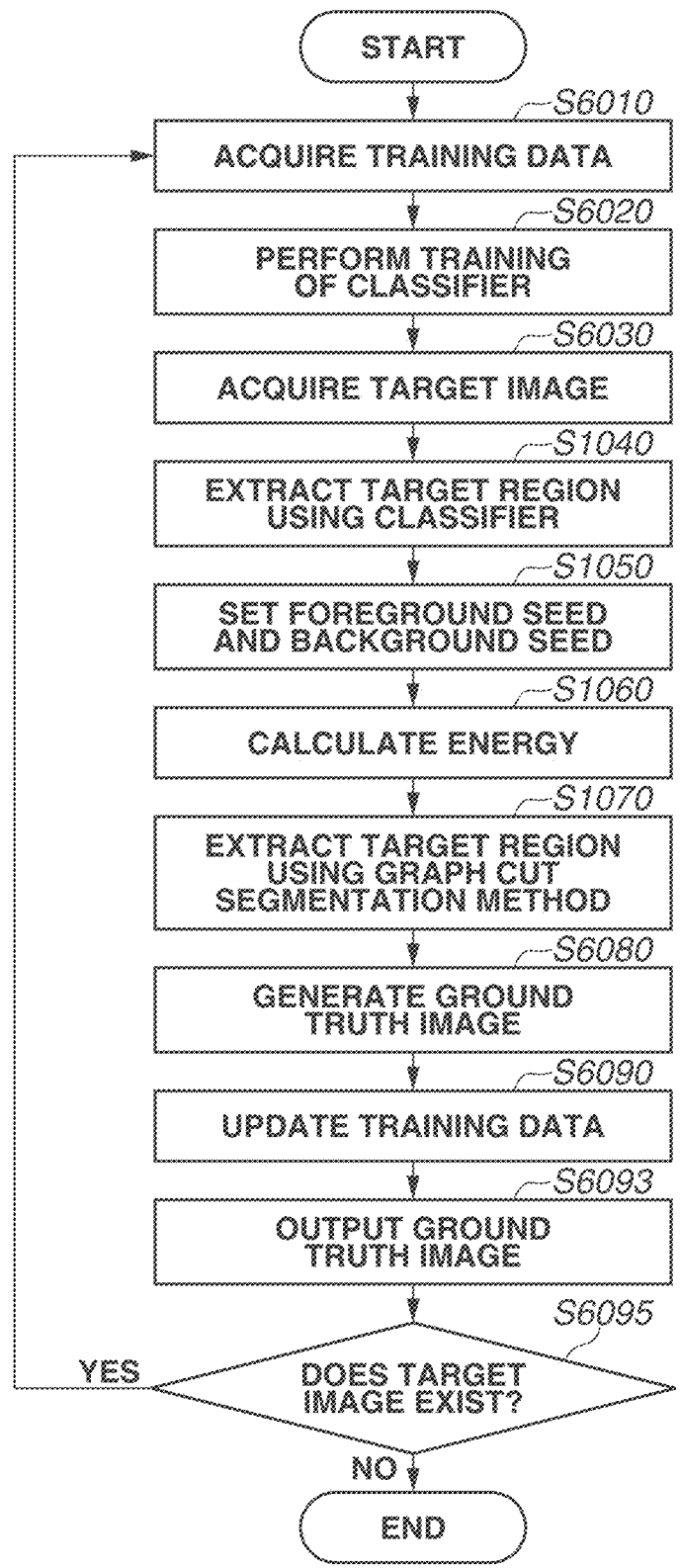

ative high accuracy. In other words, a region near the center of the target region is generally extracted with relatively high accuracy.

IMAGE PROCESSING APPARATUS, IMAGE PROCESSING METHOD, AND NON-TRANSITORY COMPUTER-READABLE STORAGE MEDIUM

BACKGROUND

Field of the Disclosure

The present disclosure relates to an image processing apparatus that generates a ground truth image designating a target region in an image captured by an imaging apparatus, an image processing method, and a non-transitory computer-readable storage medium.

Description of the Related Art

Among image processing techniques, segmentation is one of important techniques. The segmentation refers to processing of distinguishing a target region in an image, from a region other than the target region. The segmentation is also referred to as region extraction, region division, or image division. While a large number of segmentation methods have been proposed so far, a method that is based on machine learning as discussed in "Olaf Ronneberger, et al. "U-Net: Convolutional Networks for Biomedical Image Segmentation", MICCAI, 2015" has recently attracted attention.

SUMMARY

Since much effort is required to create a ground truth image, it is difficult to create a large number of ground truth images.

The present invention is directed to an image processing apparatus that can generate a ground truth image with less effort.

According to an aspect of the present invention, an image processing apparatus includes a first extraction unit configured to extract a first target region from an image using a trained classifier, a setting unit configured to set region information to be used in a graph cut segmentation method, based on a first extraction result including the first target region, a second extraction unit configured to extract a second target region using the graph cut segmentation method based on the set region information, and a generation unit configured to generate a ground truth image corresponding to the image, based on a second extraction result including the second target region.

Further features of the present invention will become apparent from the following description of exemplary embodiments with reference to the attached drawings.

BRIEF DESCRIPTION OF THE DRAWINGS

FIG. 6 is a flowchart illustrating a processing procedure of the image processing apparatus according to the second exemplary embodiment.

DESCRIPTION OF THE EMBODIMENTS

Figure 1:
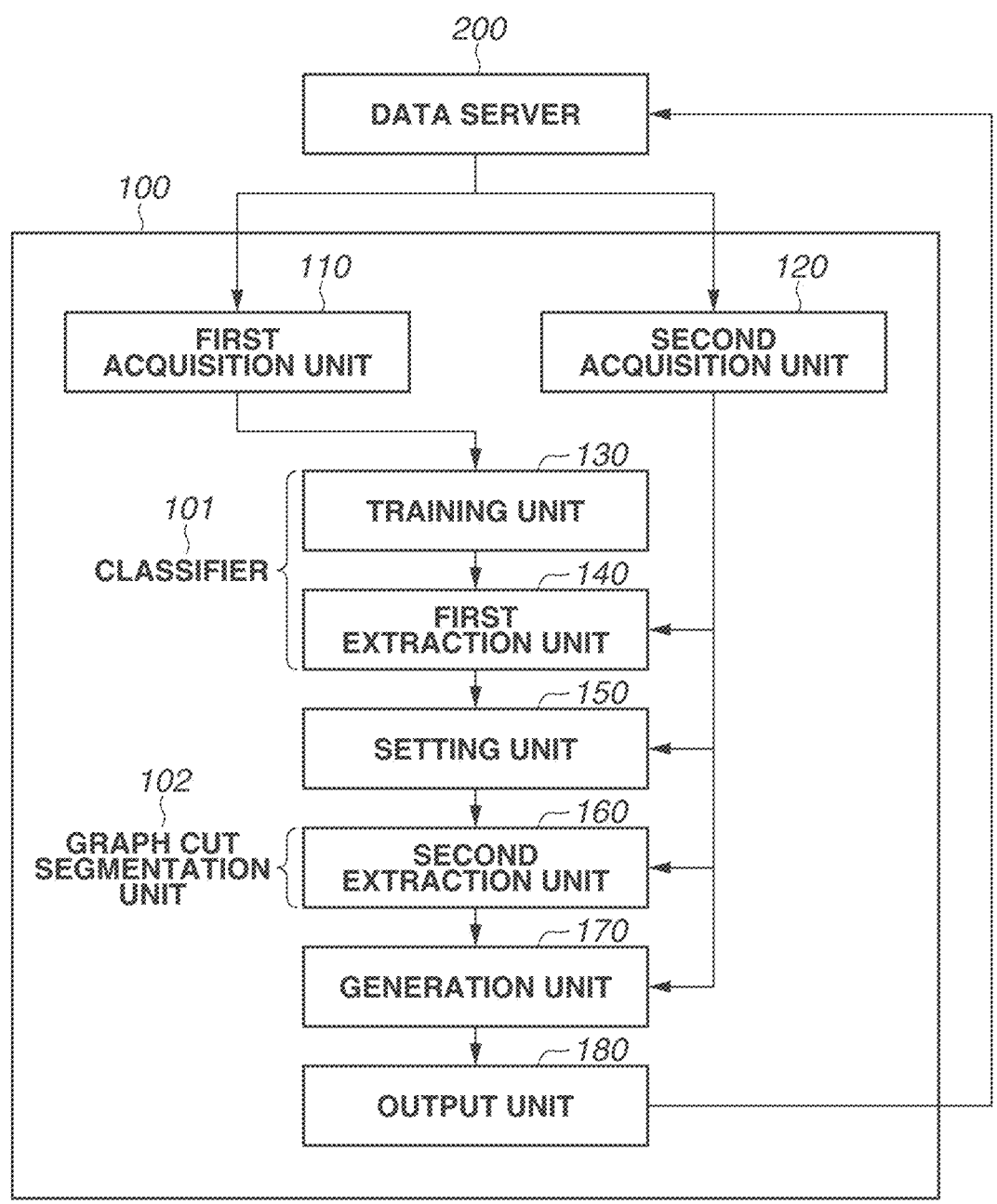
FIG. 1 is a diagram illustrating a configuration of an image processing apparatus according to a first exemplary embodiment.

Hereinafter, exemplary embodiments of the present invention will be described with reference to the drawings. The same or equivalent components, members, and processes illustrated in the drawings are assigned the same reference numerals or step numbers, and the redundant descriptions will be appropriately omitted. The components, members, and processes will be partially omitted in the drawings.

Hereinafter, exemplary embodiments of the present invention will be described using, as an example, an abdominal computed tomography (CT) image of a liver captured by an X-ray computed tomographic imaging apparatus (X-ray CT apparatus). In the exemplary embodiments of the present invention, a target object is a liver in an abdominal region of a human body, and an abdominal CT image obtained by capturing an image of the abdominal region is a training image. A liver image included in an abdominal X-ray CT image is a target region. A ground truth image corresponds to the training image, and refers to an image representing position information of the target object in the training image.

The present invention is applicable not only to other internal organs but also to any structure in a human body such as bones or muscle. The present invention is also applicable to a tomographic image captured by a nuclear magnetic resonance imaging apparatus (magnetic resonance imaging (MRI) apparatus), a positron emission tomography (PET) imaging apparatus, or an ultrasonic imaging apparatus, or a normal image captured by a camera. The present invention is applicable to a two-dimensional image and a three-dimensional image. Furthermore, the present invention is also applicable to an actual image obtained by capturing an image of a general object. Exemplary embodiments of the present invention are not limited to the following exemplary embodiments.

Exemplary Embodiment

Hereinafter, a configuration of an image processing apparatus according to an exemplary embodiment will be described with reference to FIG. 1. An image processing apparatus 100 according to an exemplary embodiment of the present invention initially extracts a target region in an image, using a classifier 101. Next, the image processing apparatus 100 extracts a target region in an image again by a graph cut segmentation unit 102 using a known graph cut segmentation method. At the graph cut segmentation, the image processing apparatus 100 constructs a graph to be used by the graph cut segmentation unit 102, based on an extraction result of the target region that is obtained by the classifier 101. The image processing apparatus 100 corrects an extraction result of the target region that is obtained by the graph cut segmentation unit 102, and generates a ground truth image corresponding to the image.

Even in the case of extracting a target region using a classifier trained using a small number of training images and a small number of ground truth images, a region near the center of the target region is generally extracted with relatively high accuracy. Nevertheless, if training data input to the classifier is not enough, a region near the boundary of the target region sometimes fails to be correctly extracted as a target region. As a result, in some cases, a target region fails to be sufficiently extracted or an outside region of the target region is erroneously extracted as a target region, for example.

Meanwhile, the known graph cut segmentation method can extract both of the region near the center of the target region and the region near the boundary of the target region with very high accuracy when a graph is appropriately constructed by a setting unit. For the setting unit appropriately constructing a graph, it is necessary to set region information. The region information includes two types of information respectively corresponding to a foreground seed and a background seed. The foreground seed is information indicating at least partial regions of regions set as a target region, among regions in an image. The background seed is information indicating at least partial regions of regions not set as the target region. If a graph that is based on these two types of information is constructed by the setting unit, it is possible to extract a target region using the graph cut segmentation method.

While paying attention to the above-described points, the image processing apparatus 100 according to an exemplary embodiment of the present invention initially extracts a target region using the classifier 101. Next, a setting unit 150 deletes a region near the boundary of the region extracted using the classifier 101. Based on the extracted region remaining from the deletion, the setting unit 150 further sets a foreground seed and a background seed of a graph. Using the set foreground seed and the background seed, the setting unit 150 constructs a graph. Lastly, the graph cut segmentation method is executed on the extracted remaining region based on the constructed graph. Using such a method, a target region in an image is extracted with high accuracy. The thus extracted region is regarded as a correct region. The correct region corresponds to position information of a target object in a ground truth image.

The image processing apparatus 100 includes a first acquisition unit 110 that acquires training data including a set of a training image and a ground truth image, a second acquisition unit 120 that acquires an image, and a training unit 130 that performs training of the classifier 101. The image processing apparatus 100 further includes a first extraction unit 140 that extracts a target region using the trained classifier 101, the setting unit 150 that sets region information based on an extraction result of the first extraction unit 140, a second extraction unit 160 that extracts a target region based on the set region information, and a generation unit 170 that generates a ground truth image based on an extraction result. The image processing apparatus 100 further includes an output unit 180 that outputs a result. Data to be input to the image processing apparatus 100 and data output by the image processing apparatus 100 are stored in a data server 200. The data server 200 is an example of a computer storage medium and is a large-capacity information storage device such as a hard disk drive (HDD) or a solid state drive (SSD). The data server 200 may be disposed in the image processing apparatus 100, or may be separately disposed outside of the image processing apparatus 100 while communication between the data server 200 and the image processing apparatus 100 is performed via a network. The training unit 130 and the first extraction unit 140 include the classifier 101, and the second extraction unit 160 includes the graph cut segmentation unit 102. In other words, the training unit 130 and the first extraction unit 140 correspond to the classifier 101, and the second extraction unit 160 corresponds to the graph cut segmentation unit 102.

The first acquisition unit 110 acquires training data from the data server 200. Then, the first acquisition unit 110 transmits the acquired training data to the training unit 130.

Figure 3:
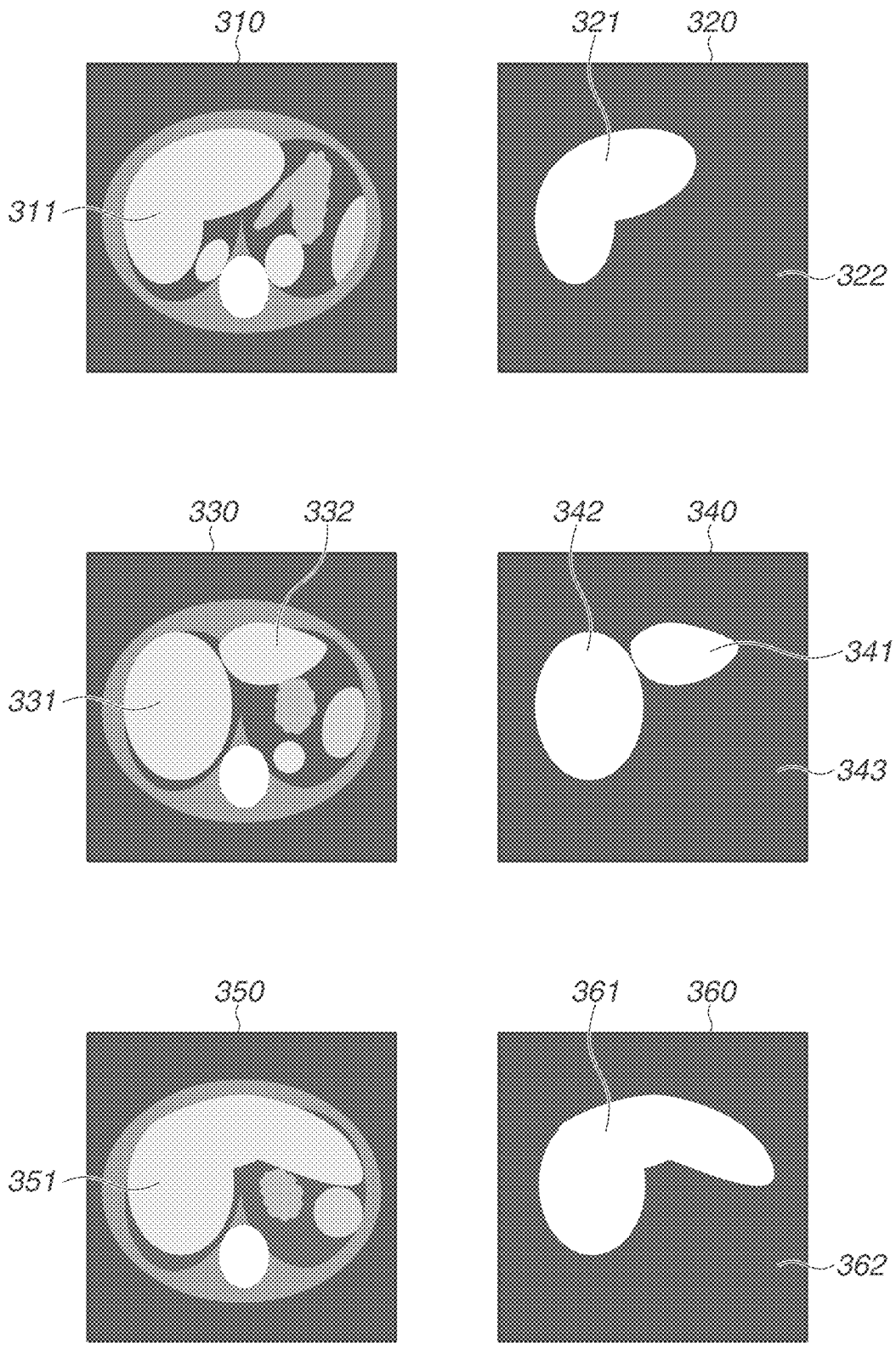
FIG. 3 is a diagram illustrating an example of training data of the image processing apparatus according to the first exemplary embodiment.

The training data will be described with reference to FIG. 3. FIG. 3 illustrates an example of training data in the image processing apparatus 100 according to the first exemplary embodiment. In the image processing apparatus 100 according to the present exemplary embodiment, the training data includes at least one training image and one ground truth image. Training images 310, 330, and 350 illustrated in FIG. 3 are examples of training images. The training images 310, 330, and 350 each represent a cross section (transverse section) image of three-dimensional abdominal computed tomography obtained by capturing an abdominal region of a different one of a plurality of different patients. A region 311 in the training image 310 corresponds to a liver. Similarly, regions 331 and 332 in the training image 330 also correspond to a liver. A region 351 in the training image 350 also corresponds to a liver. Thus, in FIG. 3, the regions 311, 331, 332, and 351 are target regions.

Next, a ground truth image will be described. At least one ground truth image is paired with a training image. In the examples of the training data illustrated in FIG. 3, a ground truth image 320 is a ground truth image corresponding to the training image 310. Similarly, a ground truth image 340 is a ground truth image corresponding to the training image 330, and a ground truth image 360 is a ground truth image corresponding to the training image 350. At least one pixel of a corresponding ground truth image corresponds to each pixel of a training image. In the example of a set of the training image 310 and the ground truth image 320, the pixels of the training image 310 correspond to the respective pixels of the ground truth image 320. The same applies to a set of the training image 330 and the ground truth image 340, and a set of the training image 350 and the ground truth image 360. A pixel value of each pixel of a ground truth image indicates whether a corresponding pixel of a training image is a pixel belonging to a target region. In the example of the ground truth image 320, a pixel illustrated in white color is a pixel belonging to a target region, and a pixel illustrated in black color is a pixel not belonging to the target region. A region 321 of the ground truth image 320, regions 341 and 342 of the ground truth image 340, and a region 361 of the ground truth image 360 will be referred to as correct regions.

A pixel value to be allocated by the generation unit 170 to each pixel of a ground truth image is binary or multivalued depending on the classifier 101 (to be described below) to be used by the training unit 130 and the first extraction unit 140. The ground truth images 320, 340, and 360 are examples of binary images.

As long as pixels representing a region of a target object are distinguishable from other pixels in a training image, a pixel value of a corresponding ground truth image may be any value. For example, a pixel value of a ground truth image generated by the generation unit 170 may be either 1 or 2. As a pixel value of a ground truth image generated by the generation unit 170, an arbitrary one value of a plurality of different values may be allocated to pixels representing a region of a target object and other pixels. In the present exemplary embodiment, the description has been given of processing performed by a classifier that classifies regions into two classes corresponding to a liver serving as a target object, and to other regions. Nevertheless, the number of classes is not limited. For example, regions may be classified into a liver, a kidney, and other regions. Also when there is a plurality of classes, a pixel value to be allocated to each pixel of a ground truth image generated by the generation unit 170 may be binary or multivalued.

FIG. 3 illustrates an example of a training image in which a target region is included. Nevertheless, training data handled by the image processing apparatus 100 according to the first exemplary embodiment may include a training image in which a target object is not included. In this case, a correct region is not included in a corresponding ground truth image.

A functional configuration of the image processing apparatus 100 according to the present exemplary embodiment will be described again with reference to FIG. 1. The second acquisition unit 120 acquires an image from the data server 200. Hereinafter, an image acquired by the second acquisition unit 120 from the data server 200 will be described as a target image. The second acquisition unit 120 transmits the acquired target image to the first extraction unit 140, the setting unit 150, the second extraction unit 160, and the generation unit 170.

The target image acquired by the second acquisition unit 120 may be an image in which a corresponding ground truth image is included, or may be an image in which a corresponding ground truth image is not included. The target image may be an image included in training data as a training image. Yet alternatively, the target image may be an image in which a target region is included, or may be an image in which a target region is not included.

The training unit 130 receives training data from the first acquisition unit 110. The training unit 130 performs training of the classifier 101 using the received training data. By performing training of the classifier 101, the training unit 130 acquires a learning result (a parameter of the classifier 101). The training unit 130 transmits the parameter of the classifier 101 to the first extraction unit 140. The training unit 130 may be disposed outside of the image processing apparatus 100. For example, the classifier 101 may be disposed on a cloud and learning may be performed on the cloud, or a parameter obtained by the classifier 101 trained by another image processing apparatus may be transmitted to the first extraction unit 140.

The classifier 101 that is used by the training unit 130 and the first extraction unit 140 will be described. In the image processing apparatus 100 according to the first exemplary embodiment, the classifier 101 outputs, for each of a plurality of pixels of an image, a value indicating whether the pixel belongs to a target region. In other words, the classifier 101 means an image processing procedure for segmentation. An image processing procedure that is based on machine learning is an example of the above-described classifier 101. Examples of the image processing procedure that is based on machine learning include a support vector machine, Ada-Boost, and a neural network.

A procedure that is not based on machine learning, such as threshold processing, region expansion, or a level set method is also used as a different type of image processing procedure. In the image processing apparatus 100 according to the first exemplary embodiment, both image processing procedures of the above-described image processing procedure that is based on machine learning, and the above-described another type of image processing procedure that is not based on machine learning can be used. An image processing procedure may be a combination of a plurality of image processing procedures. The image processing procedure may use a method that is based on machine learning, a method that is not based on machine learning, or a method of a combination of the both methods. Irrespective of whether the image processing procedure is an image processing procedure that is based on machine learning or an image processing procedure that is not based on machine learning, the training unit 130 and the first extraction unit 140 use the same classifier 101.

Next, a parameter of the classifier 101 that is to be acquired by the training unit 130 by learning will be described. The parameter of the classifier 101 varies depending on the classifier 101 used by the training unit 130 and the first extraction unit 140. For example, in the case of using the support vector machine as the classifier 101, a value of a weight vector of a classification function is regarded as a parameter of the classifier 101, and a parameter of a kernel function is also regarded as a parameter of the classifier 101 in the case of using a kernel trick. In the case of using the AdaBoost as the classifier 101, a weak classifier selected by a training algorithm of the AdaBoost, a parameter of the weak classifier, and a weight to be allocated to the weak classifier are regarded as parameters of the classifier 101. In the case of using the neural network as the classifier 101, a weight of a network is regarded as a parameter of the classifier 101.

When the classifier 101 is an image processing unit that is not based on machine learning, a parameter defining an operation of the classifier 101 is regarded as a parameter of the classifier 101. For example, in the case of using the threshold processing as the classifier 101, a threshold is regarded as a parameter of the classifier 101. In the case of using region expansion processing as the classifier 101, parameters used in an expansion condition and an end condition are regarded as parameters of the classifier 101. In the case of using the level set method as the classifier 101, a parameter of a velocity function is regarded as a parameter of the classifier 101.

A functional configuration of the image processing apparatus 100 according to the present exemplary embodiment will be described again with reference to FIG. 1. The first extraction unit 140 acquires the target image from the second acquisition unit 120. The first extraction unit 140 acquires the parameter of the classifier 101 from the training unit 130. Next, the first extraction unit 140 applies a predetermined classifier 101 to the target image, and extracts a target region in the target image. Lastly, the first extraction unit 140 transmits the extracted region (first extraction result) to the setting unit 150.

The first extraction result will now be described. Depending on the type of the classifier 101 used by the training unit 130 and the first extraction unit 140, a pixel value to be allocated by the classifier 101 to each of a plurality of pixels can be binary or multivalued. When the first extraction result is a binary image having binary pixel values, a first pixel value is set to a pixel determined by the classifier 101 to be a pixel belonging to a target region, among pixels in a target image. Then, a pixel value different from the first pixel value is set to a pixel determined by the classifier 101 to be a pixel not belonging to the target region.

When the first extraction result is a multivalued image having multivalued pixel values, a pixel value of the first extraction result indicates a likelihood being a probability of the pixel belonging to the target region. For example, when a pixel value indicating a likelihood is a high value, it means that the pixel has a high possibility of belonging to the target region. When a pixel value indicating a likelihood is a low value, it means that the pixel has a low possibility of belonging to the target region. Hereinafter, an aggregate of pixels determined to be pixels belonging to a target region or an aggregate of pixels determined to be pixels having possibility of belonging to the target region, even if only slightly, will be referred to as a first extracted region.

The setting unit 150 acquires the target image from the second acquisition unit 120. The setting unit 150 acquires an extraction result of a target region (first extraction result) from the first extraction unit 140. Next, referring to the target image and the extraction result of the target region, the setting unit 150 sets information (region information) for constructing a graph to be used by the graph cut segmentation unit 102. The information at least includes information regarding a foreground seed and a background seed. In addition to the information regarding a foreground seed and a background seed, an energy value to be applied to an edge (t-link) may be included as the region information. Hereinafter, the information set by the setting unit 150 will be described as graph information. The setting unit 150 transmits the graph information to the second extraction unit 160.

The second extraction unit 160 acquires the target image from the second acquisition unit 120. The second extraction unit 160 acquires the graph information from the setting unit 150. Next, the second extraction unit 160 applies the known graph cut segmentation method to the image, and extracts a target region in the target image. The second extraction unit 160 transmits the extracted region (second extraction result) to the generation unit 170.

The generation unit 170 acquires the target image from the second acquisition unit 120. The generation unit 170 acquires the second extraction result from the second extraction unit 160. Next, based on the second extraction result, the generation unit 170 generates a ground truth image corresponding to the target image. Lastly, the generation unit 170 transmits the generated ground truth image to the output unit 180. Hereinafter, a ground truth image generated by the generation unit 170 will be described as a ground truth image corresponding to a target image.

The output unit 180 acquires the ground truth image corresponding to the target image from the generation unit 170. Then, the output unit 180 stores the ground truth image corresponding to the target image into the data server 200. In addition, the output unit 180 may store the ground truth image corresponding to the target image into the data server 200 in association with the target image. In this case, the output unit 180 acquires the target image from the second acquisition unit 120. Then, the output unit 180 stores the ground truth image corresponding to the target image and the target image into the data server 200 as one set.

The output unit 180 may output the ground truth image corresponding to the target image to a display unit not illustrated in FIG. 1. A display is an example of a display device included in the display unit. The display unit may display only the ground truth image corresponding to the target image. The display unit may display both the ground truth image corresponding to the target image and the target image at the same time.

Figure 2:
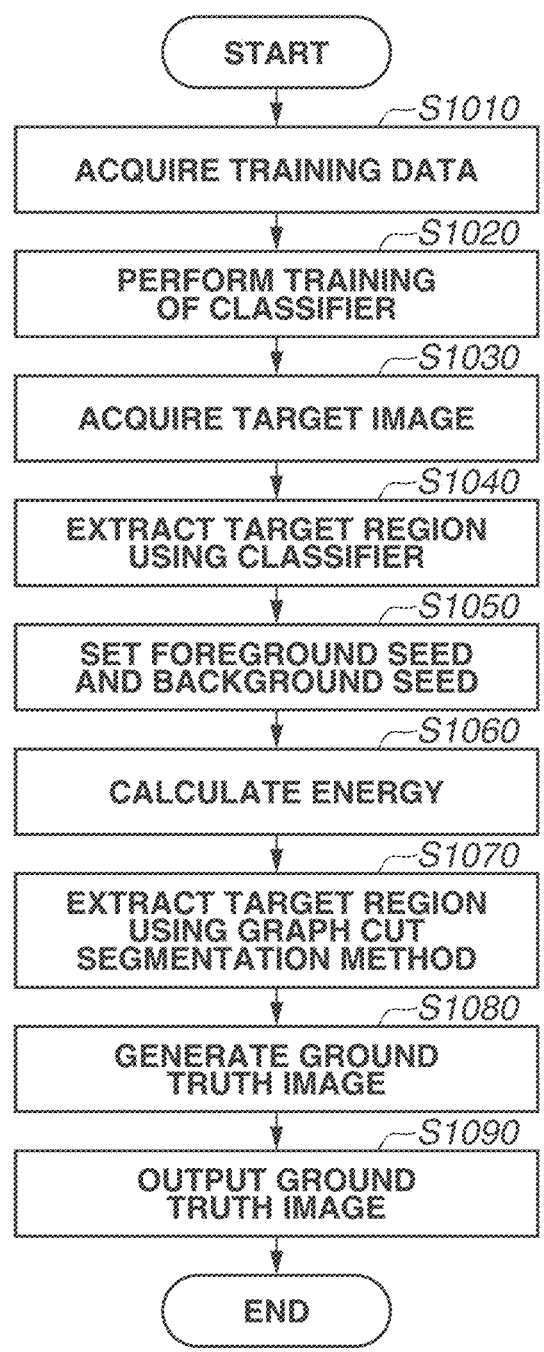
FIG. 2 is a flowchart illustrating a processing procedure of the image processing apparatus according to the first exemplary embodiment.

Next, a processing procedure of the image processing apparatus 100 according to the first exemplary embodiment will be described with reference to FIG. 2.
(S1010)
In step S1010, the first acquisition unit 110 acquires training data from the data server 200. Then, the first acquisition unit 110 transmits the acquired training data to the training unit 130.

(S1020)
In step S1020, the training unit 130 acquires the training data from the first acquisition unit 110. Then, the training unit 130 performs training of a predetermined classifier 101.

When the classifier 101 is an image processing procedure that is based on machine learning, the training unit 130 performs training of the classifier 101 using a known training algorithm. Since each classifier has its own suitable known training algorithm, the training unit 130 performs training of the classifier 101 using the known training algorithm in accordance with the classifier 101 selected by the training unit 130 and the first extraction unit 140. As an alternative to the training by the training unit 130 in the image processing apparatus 100, the training may be performed on a cloud or by another image processing apparatus.

Meanwhile, when the classifier 101 is an image processing procedure that is not based on machine learning, the training unit 130 optimizes a parameter defining an operation of the classifier 101. For example, in the case of using the threshold processing as the classifier 101, training refers to processing of determining a threshold. In the case of using the region expansion processing as the classifier 101, learning refers to processing of determining parameters that is used in an expansion condition and an end condition.

Lastly, in step S1020, the training unit 130 transmits the parameter of the classifier 101 that has been obtained by the above-described learning, to the first extraction unit 140.
(S1030)
In step S1030, the second acquisition unit 120 acquires a target image from the data server 200. Then, the second acquisition unit 120 transmits the acquired target image to the first extraction unit 140, the setting unit 150, the second extraction unit 160, and the generation unit 170.
(S1040)
In step S1040, the first extraction unit 140 acquires the target image from the second acquisition unit 120. Next, the first extraction unit 140 acquires the parameter of the classifier 101 from the training unit 130. Then, the first extraction unit 140 extracts a target region from the target image using the predetermined classifier 101.

The processing in step S1040 varies depending on an image processing procedure selected as the classifier 101. When the classifier 101 is the support vector machine, one method of machine learning, the first extraction unit 140 constructs a classification function using a weight vector of a classification function and a parameter of a kernel function that are stored as parameters of the classifier 101. Next, the first extraction unit 140 sequentially inputs a plurality of pixels of the target image to the constructed classification function, and executes calculation of the classification function. Then, the first extraction unit 140 stores a calculation result of the classification function into the first extraction result.

When the classifier 101 is the AdaBoost, the first extraction unit 140 constructs a strong classifier using the type of a weak classifier and a parameter of the weak classifier that are stored as parameters of the classifier 101. Next, the first extraction unit 140 sequentially inputs a plurality of pixels of the target image to the constructed strong classifier, and executes calculation of the strong classifier. Then, the first extraction unit 140 stores a calculation result of the strong classifier into the first extraction result.

When the classifier 101 is the neural network, the first extraction unit 140 constructs a network using a weight of a network that is stored as a parameter of the classifier 101. Next, the first extraction unit 140 sets values of a plurality of pixels of the target image to an input layer of the network.

After that, the first extraction unit 140 performs calculation of a weight layer of the network, and lastly performs calculation of an output layer. Lastly, the first extraction unit 140 stores a calculation result of the output layer into the first extraction result.

The same applies to the case where the classifier 101 is an image processing procedure that is not based on machine learning. For example, when the classifier 101 is the threshold processing, the first extraction unit 140 applies the threshold processing to the target image using a threshold stored as a parameter of the classifier 101. When the classifier 101 is the region expansion, the first extraction unit 140 applies the region expansion processing to the target image using parameters of an expansion condition and an end condition that are stored as parameters of the classifier 101. When the classifier 101 is the level set method, the first extraction unit 140 applies the level set method to the target image using a parameter of a velocity function that is stored as a parameter of the classifier 101. After executing any of these image processing units, the first extraction unit 140 stores a calculation result into the first extraction result.

After ending the above-described processing, the first extraction unit 140 transmits the first extraction result to the setting unit 150.

(S1050)

In step S1050, the setting unit 150 acquires the target image from the second acquisition unit 120. Next, the setting unit 150 acquires the first extraction result from the first extraction unit 140. Then, the setting unit 150 sets a foreground seed and a background seed to be used in the known graph cut segmentation method.

A setting method of a foreground seed and a background seed will be described with reference to FIG. 4. In step S1050, the setting unit 150 performs different types of processing between a case where the first extraction result acquired in step S1040 is binary and a case where the first extraction result is multivalued. First of all, processing to be performed in the case where the first extraction result is a binary image will be described.

Figure 4:
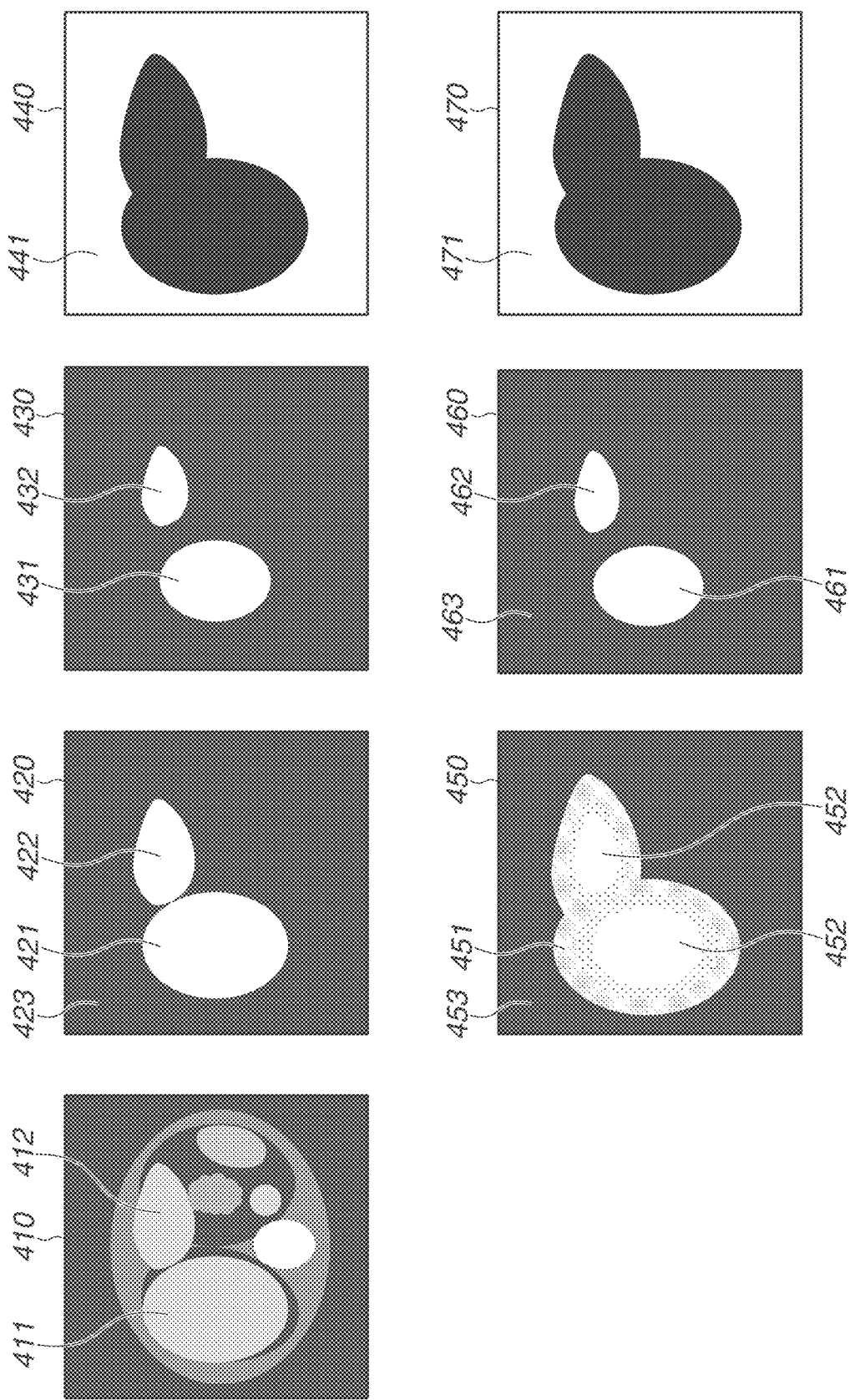
FIG. 4 is a diagram illustrating a setting method of a foreground seed and a background seed.

A target image 410 illustrated in FIG. 4 is an image acquired by the second acquisition unit 120 in step S1030. Regions 411 and 412 in the target image 410 correspond to a liver as a target region. An image illustrated in FIG. 4 is a first extraction result 420 output by the first extraction unit 140 in step S1040. Regions in the first extraction result 420 are first extracted regions 421 and 422 classified by the classifier 101 as a target region. As seen from the comparison between the target region 411 and the first extracted region 421, the classifier 101 extracts a center portion of the target region 411 approximately correctly, but fails to correctly classify a location near the boundary of the target region 411. The same applies to the target region 412 and the first extracted region 422.

While paying attention to the above-described relationship between a target region and a first extracted region, the setting unit 150 sets, as region information, a foreground seed and a background seed in such a manner that contours of the target regions 411 and 412 are three-dimensionally held between the foreground seed and the background seed. In other words, the setting unit 150 sets the foreground seed inside the first extracted region and sets the background seed to a region other than the first extracted region (outside region of the first extracted region).

Specifically, the processing is performed as follows. For setting a foreground seed, the setting unit 150 applies reduction processing, which is one of morphological operations, to the first extracted regions 421 and 422 in the first extraction result 420. A region obtained by the reduction processing is set as a foreground seed. Regions 431 and 432 in an image 430 are examples of the foreground seed. The image 430 is a result obtained by applying the reduction processing to the first extraction result 420. The reduction processing reduces three-dimensionally the first extracted regions 421 and 422. Thus, even if the first extracted regions 421 and 422 do not exactly coincide with the target regions 411 and 412, regions (the regions 431 and 432) obtained by reducing the first extracted regions 421 and 422 are expected to fall inside the target regions 411 and 412. Thus, the regions 431 and 432 are set as a foreground seed.

Next, for setting a background seed, the setting unit 150 applies the reduction processing, which is one of morphological operations, to a region 423 being a region other than the first extracted regions 421 and 422 of the first extraction result 420. A region obtained by the reduction processing is set as a background seed. A region 441 in an image 440 is an example of a background seed. The image 440 is a result obtained by applying the reduction processing to the region 423 in the first extraction result 420. The region 441 has a very high possibility of covering a region other than the target regions 411 and 412, as a result of the reduction processing. Thus, the region 441 is set as a background seed.

The setting unit 150 sets the images 430 and 440 obtained by the above-described processing, as a foreground seed and a background seed in the case where the first extraction result is a binary image.

Next, the description will be given of processing in which the setting unit 150 sets a foreground seed and a background seed, which are region information, in the case where the first extraction result is a multivalued image. In step S1040, the first extraction unit 140 processes the target image 410. An image illustrated in FIG. 4 is a first extraction result 450 output by the first extraction unit 140. The first extraction result 450 is a multivalued image, and regions 451 and 452 are regions (first extracted regions) determined by the classifier 101 to have a possibility of belonging to the target regions 411 and 412. A region 453 is a region determined not to be a target region.

As seen from the first extraction result 450, in the region 452 corresponding to the center portions of the target regions 411 and 412, a pixel value indicating a likelihood of belonging to the target region is high. Meanwhile, in the region 451 corresponding to rim portions of the target regions 411 and 412, a pixel value indicating a likelihood of belonging to the target region is low. Generally, a first extracted region has a high value in the center portion of a target region. In contrast, a first extracted region has a low value in the rim portion of a target region.

While paying attention to the above-described relationship between the target region and the first extracted region, the setting unit 150 sets a foreground seed and a background seed in such a manner that the contours of the target regions 411 and 412 are three-dimensionally held between the foreground seed and the background seed. In other words, the setting unit 150 sets the foreground seed inside the first extracted region and sets the background seed to a region other than the first extracted region (outside region of the first extracted region).

Specifically, the processing is performed as follows. For setting a foreground seed, the setting unit 150 applies the threshold processing to the first extraction result 450. Regions 461 and 462 in an image 460 are regions obtained by the threshold processing. The regions 461 and 462 have a high possibility of being included in the target regions 411 and 412, respectively. Thus, the regions 461 and 462 are set as a foreground seed.

Next, for setting a background seed, the setting unit 150 applies the reduction processing to a region 463 being a region other than the foreground seeds 461 and 462 of the image 460. Then, a region obtained by the reduction processing is set as a background seed. A region 471 in an image 470 is a region obtained by applying the reduction processing to the region 463 in the image 460. The region 471 has a very high possibility of covering a region other than the target regions 411 and 412. Thus, the region 471 is set as a background seed.

The setting unit 150 sets the images 460 and 470 obtained through the above-described processing, as a foreground seed and a background seed in the case where the first extraction result is a multivalued image.

Heretofore, the processing in which the setting unit 150 sets a foreground seed and a background seed has been described. A key point of the above-described processing lies in that a foreground seed is set inside the first extracted region and a background seed is set outside the first extracted region. For implementing such a setting, the setting unit 150 arranges the foreground seed in an inner region distant from the boundary of the first extraction result by a predetermined distance. The setting unit 150 arranges the background seed in an outer region distant from the boundary of the first extraction result by a predetermined distance.

In the above-described example, the setting unit 150 sets a foreground seed and a background seed using the threshold processing and the reduction processing, but a similar setting can be implemented using distance conversion processing. For example, the setting unit 150 applies distance conversion to the first extraction result 420 and acquires a distance image. Pixel values of the distance image are Euclidean distance values to the boundaries of the first extracted regions 421 and 422. Thus, by performing the threshold processing on the distance image using a predetermined distance value, it is possible to obtain a foreground seed similar to the foreground seeds 431 and 432, and a background seed similar to the background seed 441. The setting unit 150 may apply distance conversion to the image 460. Distance values of a distance image obtained in this process are distance values from the boundaries of the foreground seeds 461 and 462. Thus, by performing the threshold processing on the distance image using a predetermined distance value, it is possible to obtain a background seed similar to the background seed 471. By applying the distance conversion and the threshold processing to the first extraction result 450, it is possible to obtain a foreground seed similar to the foreground seeds 461 and 462. The setting unit 150 subsequently performs processing in step S1060.

(S1060)

In step S1060, the setting unit 150 calculates, for each of a plurality of pixels other than pixels set as the foreground seed or the background seed, energy to be applied to an edge (t-link) to be used in the known graph cut segmentation method. The energy is calculated based on a region (first extraction result) extracted using the classifier 101.

First of all, the setting unit 150 calculates, for each of the plurality of pixels other than the pixels set as the foreground seed and the background seed, a distance from the boundary of the foreground seed. Then, the setting unit 150 calculates a value of energy corresponding to the distance from the boundary of the foreground seed. As an example, the calculation is performed as follows. An energy value to be applied to a pixel closest to the boundary of the foreground seed is denoted by L1. An energy value to be applied to a pixel farthest from the boundary of the foreground seed, that is to say, a pixel adjacent to the boundary of the background seed is denoted by L2. The energy values L1 and L2 satisfy $L2<0<L1$. In addition, a distance value from the foreground seed to the background seed is denoted by D2. Then, the energy value L is calculated for each of the pixels other than the pixels set as the foreground seed and the background seed, using a formula represented as Formula 1, and the energy is applied.

$$L = L1 + \frac{L2 - L1}{D2} \times d \qquad (1)$$

In Formula 1, "d" denotes a distance from the boundary of the foreground seed to a corresponding pixel. Arbitrary values may be set as the energy values L1 and L2 as long as the energy values L1 and L2 satisfy $L2<0<L1$. As a desirable example, the energy values L1 and L2 are set as $L1=1$ and $L2=-1$.

While an example of a calculation method of the energy value L to be applied to an edge (t-link) has been described, a calculation method of an energy value is not limited to the above-described example. For example, a fixed value may be applied as an energy value. As a desirable example, the energy value L is set as $L=0$.

A calculation method of the energy value L to be applied to an edge (t-link) has been described.

Lastly in step S1060, the setting unit 150 transmits, as graph information, the foreground seed and the background seed that have been obtained in step S1050, and the energy to be applied to an edge (t-link) that has been obtained in step S1060, to the second extraction unit 160.

(S1070)

In step S1070, the second extraction unit 160 extracts a target region in the target image using the known graph cut segmentation method. The details of the graph cut segmentation method are discussed in U.S. Pat. No. 6,973,212, for example.

In the graph cut segmentation method, a graph corresponding to a target image is initially generated. The generation method of the graph is the same as that in the known graph cut segmentation method.

Hereinafter, nodes corresponding to the respective pixels of the target image will be referred to as pixel nodes. One node representing a target region (liver) will be referred to as a terminal node F, and one node representing a region other than the target region will be referred to as a terminal node B. An edge connecting adjacent pixel nodes will be referred to as an edge (n-link), and an edge connecting each pixel node and two terminal nodes will be referred to as an edge (t-link).

Next, based on the graph information generated by the setting unit 150 in steps S1050 and S1060, energy is applied to the edge (t-link) connecting each pixel node and two terminal nodes. The processing of applying energy to the edge (t-link) has the following three types of methods.

(1) A case where a pixel corresponding to a pixel node is included in a foreground seed Energy to be applied to an edge (t-link) between the pixel node and the terminal node F is set to infinity. Meanwhile, energy to be applied to an edge (t-link) between the pixel node and the terminal node B is set to zero.

(2) A case where a pixel corresponding to a pixel node is included in a background seed Energy to be applied to an edge (t-link) between the pixel node and the terminal node B is set to infinity. Meanwhile, energy to be applied to an edge (t-link) between the pixel node and the terminal node F is set to zero.

(3) A case where a pixel corresponding to a pixel node is included in neither foreground seed nor background seed When the energy value L of the pixel that has been calculated by the setting unit 150 in step S1060 satisfies L>0, energy to be applied to an edge (t-link) between the pixel node and the terminal node F is set to L. On the other Meanwhile, energy to be applied to an edge (t-link) between the pixel node and the terminal node B is set to zero. When the energy value L satisfies L<0, energy to be applied to an edge (t-link) between the pixel node and the terminal node B is set to −L. Meanwhile, energy to be applied to an edge (t-link) between the pixel node and the terminal node F is set to zero. When the energy value L satisfies L=0, energy to be applied to the both edges (t-link) is set to zero.

After the above described processes, processing steps similar to those in the known graph cut segmentation method are performed. More specifically, a value (e.g., a reciprocal of a difference in pixel value) indicating a similarity in pixel value among all adjacent pixels of the target image is calculated. Then, the calculated value is applied to an edge (n-link) connecting pixel nodes corresponding to these adjacent pixels. Lastly, a graph is divided into two partial graphs using a graph division algorithm (e.g., Ford-Fulkerson method). The division is executed in such a manner that one of the partial graphs at least includes the terminal node F and the other one includes the terminal node B. In this case, a partial graph (partial graph GF) including the terminal node F includes a pixel node corresponding to "a pixel probably belonging to a target region (liver)". Then, a partial graph (partial graph GB) including the terminal node B includes a pixel node corresponding to "a pixel probably belonging to a region other than the target region". Thus, a pixel corresponding to a pixel node included in the partial graph GF is regarded as a pixel belonging to a target region (liver). A result obtained by the calculation is regarded as a second extraction result.

Lastly, the second extraction unit 160 transmits the second extraction result to the generation unit 170.

(S1080)

In step S1080, the generation unit 170 acquires the second extraction result from the second extraction unit 160. Then, based on the second extraction result, the generation unit 170 generates a ground truth image corresponding to the target image.

The simplest method of generating a ground truth image is a method of using the second extraction result as a ground truth image without making modifications to the second extraction result.

Based on the knowledge about extraction accuracy of the second extraction result that is obtained in advance, the generation unit 170 can apply predetermined image processing to the second extraction result. For example, no matter what type of the image processing apparatus 100 processes what type of target image, if a target region fails to be sufficiently extracted, the generation unit 170 applies expansion processing, which is one of morphological operations, to the second extraction result. As the result of the processing, the second extraction result is expanded. In contrast, if a region other than the target region is erroneously extracted, the generation unit 170 applies the reduction processing, which is one of morphological operations, to the second extraction result. As the result of the processing, the second extraction result is reduced. The generation unit 170 generates the second extraction result corrected by these types of image processing, as a ground truth image.

The generation unit 170 may apply a smoothing filter such as a uniform weight smoothing filter or a Gaussian filter to the second extraction result, and generate a resultant image as a ground truth image. For example, in the second extraction result output by the second extraction unit 160, a pixel value of a pixel determined to belong to a target region (liver) is set to 1, and pixel values of other pixels are set to 0. If a smoothing filter is applied to the second extraction result having such pixel values, pixel values of pixels near the boundary of a region having a pixel value of 0 and a region having a pixel value of 1 become values continuously varying from 0 to 1. Thus, the pixel value is regarded as a likelihood indicating a probability of a corresponding pixel belonging to a target region. Based on such idea, the generation unit 170 applies a smoothing filter to the second extraction result, and generates a resultant image as a ground truth image.

The generation unit 170 may correct the second extraction result based on image processing input by an operator of the image processing apparatus 100. In this case, using an operation unit not illustrated in FIG. 1, the operator designates a region insufficiently extracted as a target region or a region erroneously extracted as a target region, via a designation device. The generation unit 170 receives the designation of the operator from the operation unit (not illustrated), and applies the expansion processing or the reduction processing to the second extraction result based on the received designation. Then, the generation unit 170 generates the second extraction result corrected by these types of image processing, as a ground truth image.

Lastly, the generation unit 170 transmits the ground truth image corresponding to the target image to the output unit 180.

(S1090)

In step S1090, the output unit 180 acquires the ground truth image corresponding to the target image from the generation unit 170. Then, the output unit 180 stores the ground truth image corresponding to the target image into the data server 200.

In accordance with the above-described procedure, the image processing apparatus 100 according to the first exemplary embodiment generates a ground truth image corresponding to a target image.

By the above-described processing, the image processing apparatus 100 according to the first exemplary embodiment can extract a target region in a target image with high accuracy. Then, by using the extraction result as a ground truth image, the image processing apparatus 100 can easily generate a ground truth image corresponding to a target image with high accuracy.

An image processing apparatus 500 according to a second exemplary embodiment will be described with reference to FIG. 5. The image processing apparatus 500 includes a first acquisition unit 510, a second acquisition unit 520, a training unit 530, the first extraction unit 140, the setting unit 150, the second extraction unit 160, a generation unit 570, an update unit 580, and an output unit 590. Similarly to FIG. 1, the training unit 530 and the first extraction unit 140 include the classifier 101, and the second extraction unit 160 includes the graph cut segmentation unit 102.

The first extraction unit 140, the setting unit 150, and the second extraction unit 160 perform the similar processes as the respective processing units assigned the same reference numerals in the image processing apparatus 100 according to the first exemplary embodiment except for processing of acquiring a target image from the second acquisition unit 520. Thus, the deceptions of these processing units will be omitted.

The first acquisition unit 510 acquires training data from the data server 200. Then, the first acquisition unit 510 transmits the acquired training data to the training unit 530 and the update unit 580.

The second acquisition unit 520 acquires an image from the data server 200. Then, the second acquisition unit 520 transmits the acquired target image to the first extraction unit 140, the setting unit 150, the second extraction unit 160, the generation unit 570, and the update unit 580. The type of the target image acquired by the second acquisition unit 520 is the same as the type of the target image acquired by the second acquisition unit 120 of the image processing apparatus 100 according to the first exemplary embodiment.

The training unit 530 receives the training data from the first acquisition unit 510. Then, the training unit 530 performs training of the classifier 101 using the received training data. The method of training the classifier 101 has been described above in the description of the training unit 130 of the image processing apparatus 100 according to the first exemplary embodiment. By performing training of the classifier 101, the training unit 530 acquires a training result (a parameter of the classifier 101). The training unit 530 transmits the parameter of the classifier 101 to the first extraction unit 140 and the output unit 590.

The generation unit 570 acquires the target image from the second acquisition unit 520. The generation unit 570 acquires a second extraction result from the second extraction unit 160. Next, based on the second extraction result, the generation unit 570 generates a ground truth image corresponding to the target image. Lastly, the generation unit 170 transmits the generated ground truth image to the update unit 580 and the output unit 590.

The update unit 580 acquires the training data from the first acquisition unit 510. The update unit 580 acquires the target image from the second acquisition unit 520. The update unit 580 acquires the ground truth image corresponding to the target image from the generation unit 170. Then, the update unit 580 updates the acquired training data. The update method will be described below. The update unit 580 transmits the updated training data to the output unit 590.

The output unit 590 acquires the parameter of the classifier 101 from the training unit 530. The output unit 590 acquires the updated training data from the update unit 580. Then, the output unit 590 stores the parameter of the classifier 101 and the updated training data into the data server 200. The details of the processing executed by the output unit 590 will be described below.

Next, a processing procedure of the image processing apparatus 500 according to the present exemplary embodiment will be described with reference to FIG. 6.
(S6010)
In step S6010, the first acquisition unit 510 acquires training data from the data server 200. Then, the first acquisition unit 510 transmits the acquired training data to the training unit 530 and the update unit 580.
(S6020)
In step S6020, the training unit 530 acquires the training data from the first acquisition unit 510. Then, the training unit 530 performs training of the predetermined classifier 101. The method of training is similar to the processing executed in step S1020 by the training unit 130 of the image processing apparatus 100 according to the first exemplary embodiment.

Lastly in step S6020, the training unit 530 transmits the parameter of the classifier 101 that has been obtained by the learning, to the first extraction unit 140 and the output unit 590.
(S6030)
In step S6030, the second acquisition unit 520 acquires a target image from the data server 200. Then, the second acquisition unit 520 transmits the acquired target image to the first extraction unit 140, the setting unit 150, the second extraction unit 160, the generation unit 570, and the update unit 580.

After executing the processing in step S6030, the image processing apparatus 500 according to the second exemplary embodiment executes the processes that are executed by the image processing apparatus 100 according to the first exemplary embodiment in steps S1040, S1050, S1060, and S1070. After that, the image processing apparatus 500 executes processing in step S6080 that is to be described next.
(S6080)
In step S6080, the generation unit 570 acquires the second extraction result from the second extraction unit 160. Then, based on the second extraction result, the generation unit 570 generates a ground truth image corresponding to the target image. The generation processing of the ground truth image is similar to the processing executed by the generation unit 170 of the image processing apparatus 100 according to the first exemplary embodiment in step S1080. Lastly, the generation unit 570 transmits the ground truth image corresponding to the target image to the update unit 580 and the output unit 590.
(S6090)
In step S6090, the update unit 580 acquires the training data from the first acquisition unit 510. The update unit 580 acquires the target image from the second acquisition unit 520. The update unit 580 further acquires the ground truth image corresponding to the target image from the generation unit 170. Then, the update unit 580 updates the acquired training data.

There are two types of methods of updating training data. If a target image is not included in the training data, the update unit 580 adds a target image and a ground truth image corresponding to the target image to the training data as one set. This is the first update method. If a target image is already included in the training data, the update unit 580 replaces a ground truth image corresponding to the target image with the ground truth image generated by the generation unit 170. This is the second update method. Even if a target image is already included in the training data, the update unit 580 may add the acquired target image and a ground truth image corresponding to the target image to the training data as one set.

Lastly, the update unit 580 transmits the updated training data to the output unit 590.
(S6093)
In step S6093, the output unit 590 acquires the ground truth image corresponding to the target image from the generation unit 570. Then, the output unit 590 stores the ground truth image corresponding to the target image into the data server 200. The output unit 590 may store the target image acquired by the second acquisition unit 520, and the ground truth image corresponding to the target image that has been generated by the generation unit 570, into the data server 200 in association with each other. In this case, the output unit 180 acquires the target image from the second acquisition unit 520, which is not illustrated in FIG. 5.

Figure 5:
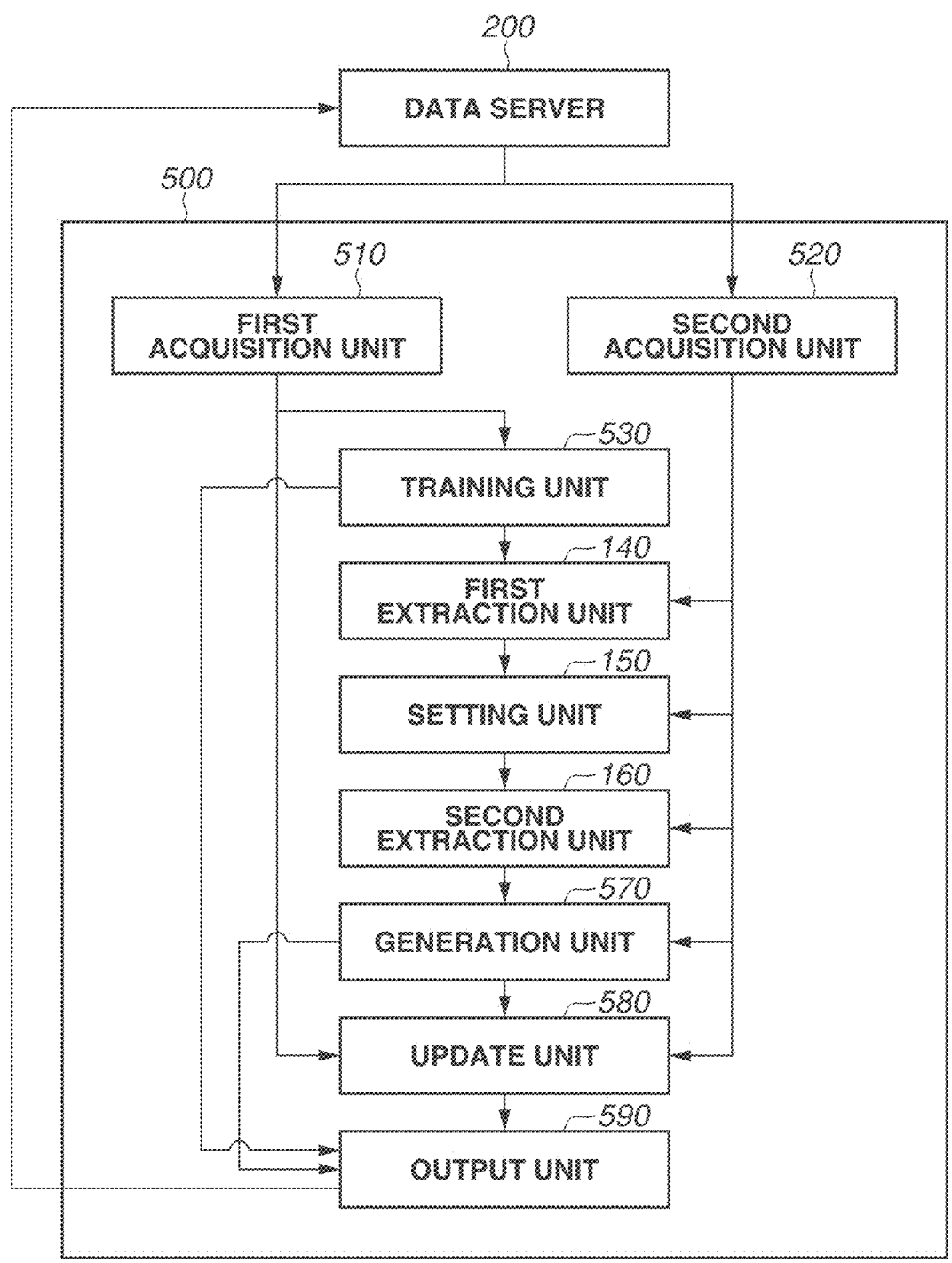
FIG. 5 is a diagram illustrating a configuration of an image processing apparatus according to a second exemplary embodiment.

In addition, in step S6093, the output unit 590 may output the ground truth image corresponding to the target image to a display unit not illustrated in FIG. 5. A display is an example of a display device included in the display unit. The display unit may display only the ground truth image corresponding to the target image. The display unit may display both the ground truth image corresponding to the target image and the target image at the same time.

In step S6093, the output unit 590 may store the parameter of the classifier 101 and the updated training data into the data server 200. In this case, the output unit 590 acquires the parameter of the classifier 101 from the training unit 530. The output unit 590 acquires the updated training data from the update unit 580.

(S6095)

In step S6095, a control unit (not illustrated in FIG. 5) of the image processing apparatus 500 according to the second exemplary embodiment determines whether a target image to be processed is in the data server 200. In a case where a target image to be processed exists (YES in step S6095), the processing returns to step S6010 and the processes in step S6010 and subsequent steps are executed again. In a case where a target image to be processed does not exist (NO in step S6095), the image processing apparatus 500 according to the second exemplary embodiment ends the processing. Even when a target image to be processed exists, training data may be not updated every time a ground truth image is generated. For example, when a plurality of target images exists, generation of ground truth images corresponding to the plurality of target images is performed using a parameter of the same learning device. Specifically, in step S6080, a ground truth image corresponding to a target image is generated. The processing may return to step S6030 in which a target image unprocessed at the time point is acquired, and the processes in step S6030 and subsequent steps may be executed (not illustrated in FIG. 6). In this case, the processing is repeated until there is no a target image to be processed.

In accordance with the above-described procedure, the image processing apparatus 500 according to the second exemplary embodiment generates a ground truth image corresponding to a target image.

The image processing apparatus 500 according to the second exemplary embodiment performs training of the classifier 101 using original training data. Then, the image processing apparatus 500 generates a ground truth image corresponding to an initial target image using the trained classifier 101, the graph cut segmentation method, and known image processing (expansion processing or reduction processing including manual correction). Subsequently, the image processing apparatus 500 updates the training data using the generated ground truth image. After that, the image processing apparatus 500 executes processing similar to the processing in the first time using the updated training data, and generates a ground truth image corresponding to the next target image. By repeatedly executing such processing, extraction accuracy of a target region in a target image gradually improves. As a result, it becomes possible to easily generate a ground truth image corresponding to a target image with high accuracy.

(Determination of End Condition)

As the second exemplary embodiment, a method of generating a ground truth image and updating training data has been described. When a ground truth image corresponding to a target image does not exist, a ground truth image corresponding to a training image is generated. Alternatively, when a ground truth image corresponding to a target image exists, the ground truth image is replaced or the target image and the ground truth image are further added to training data as one set. Then, by performing training of a classifier using generated or updated training data, and further generating a ground truth image, an effect of gradually improving extraction accuracy of a target region is expected.

An end condition to be used when learning and the generation of a ground truth image are performed a plurality of times will now be described. In the case of using a classifier that is based on machine learning, if images generated by data expansion or a generative adversarial network (GAN) based on the same image to increase the number of images are trained a plurality of times, a problem of overlearning arises. The overlearning is a problem in which accuracy declines for an image different from learning data while high classification ability is exhibited for trained data. For this reason, in the learning that is based on the same image, it is desirable to keep balance between accuracy and the number of learnings.

When a manually-created high-quality ground truth image and an extraction result extracted by a classifier are compared, and a difference between the both images is small, the accuracy of the classifier is generally determined to be high, and the comparison result is used as an end condition of learning. Also in the exemplary embodiments of the present invention, a manually-created high-quality ground truth image and a classification result obtained by a classifier may be compared, and the comparison result may be used as an end condition.

Nevertheless, especially as in the case of a medical image, since a ground truth image is created by a person having knowledge such as a doctor, a high-quality ground truth image is created at much expense in time and effort. Therefore, in a case where a high-quality ground truth image does not exist, it is difficult to end generation processing based on the above-described end condition.

Thus, when a manually-created high-quality ground truth image does not exist, an extraction result obtained by a classifier trained using training data, and an extraction result obtained by a classifier trained using previous training data or older training data (before training data is updated) may be compared, and a comparison result may be used as an end condition. Hereinafter, the former will be described as an extraction result obtained by a latest classifier, and the latter will be described as an extraction result obtained by a previous classifier.

A comparison between the extraction result obtained by the latest classifier and the extraction result obtained by the previous classifier varies depending on whether the extraction result is a binary image or a multivalued image. When an extraction result obtained by the classifier 101 is a binary image, a previous extraction result and a latest extraction result are compared, and pixels included in target regions are compared. Because the accuracy of machine learning improves as the number of learnings increases, a variation in pixels included in the target regions becomes smaller. A variation in extraction results obtained by the classifier 101 becoming a predetermined value or less is used as an end condition.

When an extraction result obtained by the classifier 101 is a multivalued image including likelihoods, the number of pixels having a likelihood of a predetermined value or more is expected to increase as the number of learnings of machine learning increases. A previous extraction result and a latest extraction result are compared, the respective pixel values of a plurality of pixels included in the extraction results are compared, and a variation in likelihood among the pixels becoming a predetermined value or less is used as an end condition. Alternatively, pixels having a likelihood of a predetermined value or more may be compared, and a variation in the pixels becoming a predetermined value or less may be used as an end condition. In addition, this structure may be applied to an image on which the graph cut segmentation has been performed based on an extraction result obtained by the classifier 101.

Furthermore, an extraction result of a target region that is obtained by the classifier 101, and an extraction result obtained by graph cut segmentation may be compared as an end condition. Specifically, pixels included in a target region extracted by the classifier 101, and pixels included in a target region extracted by the graph cut segmentation are compared, and when a difference in pixel between the both extraction results becomes a predetermined value or less, the comparison result is used as an end condition. In addition, because an extraction result obtained by the graph cut segmentation is a binary image, a likelihood may be subjected to the threshold processing and converted into a binary value when an extraction result obtained by the classifier 101 is a multivalued image. The end condition may be determined using any of the above-described methods, or may be determined using a plurality of methods of the above-described methods. The number of times defined by a user may be simply used as an end condition. Images to be compared as an end condition are not limited to extraction results (first extraction results) obtained by a classifier, or classification results (second extraction results) obtained by the graph cut segmentation, and generated ground truth images may be compared.

When the above-described determination of an end condition is performed, the image processing apparatus 500 may additionally include a determination unit that determines whether an end condition is satisfied. Specifically, when the above-described end condition is satisfied, the determination unit ends the processing, and when the end condition is not satisfied, a generation flow of a ground truth image is executed again.

(Change of Parameter)

In the case of performing learning and the generation of a ground truth image a plurality of times, the extraction accuracy of a target region is expected to improve. Because a classifier depends on the number and quality of training data, as a flow is repeated, a result with high reliability is obtained. For example, in a multivalued image, a likelihood indicating a target region or a region other than the target region is calculated to be a high value, and in a binary image, a portion in the image that is overlapping an actual target region becomes larger.

Thus, in the case of performing the processing (threshold processing, morphological processing) described with reference to FIG. 4, without changing a parameter, there is a possibility that overextraction or extraction deficiency of a target region occurs. For example, a portion overlapping an actual target region is set on the outside of a foreground seed due to the reduction processing, or a portion not overlapping an actual target region is set as a foreground seed due to the expansion processing or the threshold processing.

In view of the foregoing, in the case of repeatedly performing learning and the generation of a ground truth image, a threshold for setting a foreground seed is set to a higher value than a threshold used in the previous learning and generation of a ground truth image. Alternatively, by setting a small rate of the reduction processing or the expansion processing in the morphological processing, it becomes possible to extract a target region in accordance with the improvement in accuracy of a classifier.

A classifier that is based on machine learning sets a parameter to be used in classification, based on training data. Among various types of machine learning, while a classifier that is based on a neural network exhibits especially high classification ability, a larger volume of training data and a longer time are required in the case of searching for a parameter from scratch. When training data is not enough, a method of increasing training data by data expansion or a GAN using an image, and a method of transfer learning using, for classification, a parameter of a classifier which has been trained using another piece of training data may be used. In the case of performing the transfer learning, it is desirable that a certain relationship is recognized between another piece of training data and current training data. In the exemplary embodiments of the present invention, for example, in the case of performing learning and the generation of a ground truth image a plurality of times, a parameter of a classifier that has been previously trained may be used as a default value of a parameter of a latest classifier. There is a high correlation between previously-used training data and latest training data, and an effect of saving cost incurred for fine tuning is expected. In addition, in the case of using a parameter of a classifier that has been previously trained, the quality of the parameter is higher than a parameter of a classifier that has been obtained by learning an image with low homology. Thus, when a classifier trained based on latest training data is based on a parameter of a classifier trained based on previous training data, as homology thereof becomes higher, a learning rate of learning is set to a smaller rate. Because an update range of a parameter can be limited by setting a small learning rate of a ground truth image, a classifier having a more accurate parameter is can be generated. In the case of using a parameter of a classifier that has been previously trained, as a default value of a parameter of a latest classifier, training of the classifier may be performed using all pieces of training data stored in the data server 200. The training of the classifier may be performed using only training data used in the recent several learnings.

Other Exemplary Embodiments

An exemplary embodiment of the present invention is also implemented by executing the following processing. Software (program) for implementing a function of the above-described exemplary embodiment is supplied to a system or an apparatus via a network or each storage medium, and a computer (or a central processing unit (CPU) or a microprocessor unit (MPU)) of the system or the apparatus reading and executing the program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-072302, filed Apr. 4, 2019, which is hereby incorporated by reference herein in its entirety.

What is claimed is:

1. An image processing apparatus comprising:
a first extraction unit configured to input a medical image to a trained classifier so as to extract a target region, wherein the trained classifier is configured to output information indicating whether or not a pixel of an input medical image belongs to the target region;
a setting unit configured to set region information including seed information to be used in a graph cut segmentation method using a first extraction result including the target region;
a second extraction unit configured to extract the target region using the graph cut segmentation method based on the region information; and
a generation unit configured to generate a ground truth image corresponding to the medical image based on a second extraction result including the target region,
wherein a pixel constituting the ground truth image has a value indicating whether or not the pixel belongs to the target region as a pixel value.

2. The image processing apparatus according to claim 1, further comprising a training unit configured to perform training of a classifier based on training data.

3. The image processing apparatus according to claim 2, further comprising an update unit configured to update the training data based on the ground truth image generated by the generation unit.

4. The image processing apparatus according to claim 3, wherein the update unit replaces a ground truth image in the training data with the ground truth image generated by the generation unit.

5. The image processing apparatus according to claim 3, wherein the training unit performs training of the classifier based on the training data updated by the update unit.

6. The image processing apparatus according to claim 5, wherein the training unit further trains the trained classifier using the training data updated by the update unit to obtain a second trained classifier, and the first extraction unit extracts the target region using the second trained classifier.

7. The image processing apparatus according to claim 3, wherein the training unit further trains the trained classifier using the training data updated by the update unit.

8. The image processing apparatus according to claim 2, wherein the training unit further trains the trained classifier using the ground truth image generated by the generation unit.

9. The image processing apparatus according to claim 1, wherein the setting unit further includes a processing unit configured to perform at least one piece of processing of morphological processing, threshold processing, and distance conversion processing on the first extraction result, and sets the region information based on a processing result obtained by the processing unit.

10. The image processing apparatus according to claim 9, wherein a threshold for an extraction result obtained by a classifier trained using the training data is larger than a threshold for the first extraction result obtained by a classifier trained using training data before being updated to the training data.

11. The image processing apparatus according to claim 9, wherein a rate of morphological processing on an extraction result obtained by a classifier trained using training data before being updated to the training data is larger than a rate of morphological processing on the first extraction result obtained by a classifier trained using the training data.

12. The image processing apparatus according to claim 1, wherein the region information set by the setting unit includes at least one of a foreground seed, a background seed, and energy.

13. The image processing apparatus according to claim 12, wherein the setting unit sets the foreground seed inside the target region and sets the background seed outside the first target region.

14. The image processing apparatus according to claim 12, wherein the energy is set by the setting unit using the following formula:

$$L = L1 + \frac{L2 - L1}{D2} \times d.$$

15. The image processing apparatus according to claim 1, further comprising a determination unit configured to determine an end of generation of the ground truth image, based on any one of the first extraction result, the second extraction result, and the generated ground truth image.

16. The image processing apparatus according to claim 15, wherein the determination unit determines to end generation of the ground truth image if a variation in pixels included in the first extraction result and the second extraction result becomes a predetermined value or less.

17. The image processing apparatus according to claim 15, wherein the determination unit determines to end generation of the ground truth image if a variation in pixels included in an extraction result obtained by a classifier trained using the training data and the first extraction result obtained by a classifier trained using training data before being updated to the training data becomes a predetermined value or less.

18. The image processing apparatus according to claim 17, wherein the extraction result obtained by the classifier is a likelihood.

19. The image processing apparatus according to claim 18, wherein the determination unit determines to end generation of the ground truth image based on a difference in the likelihood.

20. The image processing apparatus according to claim 1, wherein a learning rate of a classifier that performs learning based on the training data is smaller than a learning rate of a classifier that has performed learning based on training data before being updated to the training data.

21. The image processing apparatus according to claim 1, wherein a pixel value of the ground truth image is binary or multivalued depending on the trained classifier.

22. The image processing apparatus according to claim 1, wherein the ground truth image can be used as ground truth to train the trained classifier to extract a target region in an image.

23. The image processing apparatus according to claim 1, wherein the generation unit generates the ground truth image by correcting the second extraction result.

24. An image processing method comprising:
   inputting a medical image to a trained classifier to extract a target region, wherein the trained classifier outputs information indicating whether or not a pixel of an input medical image belongs to the target region;
   setting region information including seed information to be used in a graph cut segmentation method, using a first extraction result including the target region;
   extracting the target region using the graph cut segmentation method based on the region information; and
   generating a ground truth image corresponding to the medical image, based on a second extraction result including the target region,
   wherein a pixel constituting the ground truth image has a value indicating whether or not the pixel belongs to the target region as a pixel value.

25. A non-transitory computer-readable storage medium storing a program for causing a computer to execute a process comprising:
   inputting a medical image to a trained classifier to extract a target region, wherein the trained classifier outputs information indicating whether or not a pixel of an input medical image belongs to the target region;
   setting region information including seed information to be used in a graph cut segmentation method, using a first extraction result including the target region;
   extracting the target region using the graph cut segmentation method based on the region information; and
   generating a ground truth image corresponding to the medical image, based on a second extraction result including the target region,
   wherein a pixel constituting the ground truth image has a value indicating whether or not the pixel belongs to the target region as a pixel value.

\* \* \* \* \*